(12) United States Patent
Matsubayashi

(10) Patent No.: US 10,297,230 B2
(45) Date of Patent: May 21, 2019

(54) IMAGE PROCESSING APPARATUS

(71) Applicant: CANON KABUSHIKI KAISHA, Tokyo (JP)

(72) Inventor: Kazuhiro Matsubayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 15/597,392

(22) Filed: May 17, 2017

(65) Prior Publication Data

US 2017/0345392 A1 Nov. 30, 2017

(30) Foreign Application Priority Data

May 24, 2016 (JP) ................. 2016-103316

(51) Int. Cl.
*H04N 5/232* (2006.01)
*G09G 5/10* (2006.01)
*G09G 5/00* (2006.01)
*H04N 5/247* (2006.01)

(52) U.S. Cl.
CPC ............. *G09G 5/10* (2013.01); *G09G 5/003* (2013.01); *H04N 5/23293* (2013.01); *H04N 5/247* (2013.01); *G09G 2320/0271* (2013.01); *G09G 2320/0626* (2013.01); *G09G 2354/00* (2013.01)

(58) Field of Classification Search
CPC ................................................ H04N 5/23293
USPC ................................................... 348/333.01
See application file for complete search history.

(56) References Cited

U.S. PATENT DOCUMENTS

| | | | | |
|---|---|---|---|---|
| 2013/0235069 | A1* | 9/2013 | Ubillos | G09G 5/026 345/594 |
| 2015/0237262 | A1* | 8/2015 | Hamada | H04N 5/23293 348/333.11 |
| 2016/0105614 | A1* | 4/2016 | Kudo | H04N 5/243 348/333.12 |
| 2017/0038949 | A1* | 2/2017 | Chen | G06F 3/04845 |

FOREIGN PATENT DOCUMENTS

JP 2013-016905 A 1/2013

* cited by examiner

*Primary Examiner* — Anthony J Daniels
(74) *Attorney, Agent, or Firm* — Cowan, Liebowitz & Latman, P.C.

(57) ABSTRACT

An image processing apparatus includes: a first acquiring unit configured to acquire first image data; a second acquiring unit configured to acquire information related to a first exposure value; a setting unit configured to set any of a plurality of display modes; and a generating unit configured to generate second image data from the first image data, wherein in a case where a first display mode has been set, the generating unit generates second image data having brightness corresponding to the first exposure value, in a case where a second display mode has been set, the generating unit generates second image data having brightness corresponding to a second exposure value, and the second exposure value used in the second display mode is changeable in accordance with a user instruction.

15 Claims, 9 Drawing Sheets

IMAGE PROCESSING APPARATUS

BACKGROUND OF THE INVENTION

Field of the Invention

The present invention relates to an image processing apparatus.

Description of the Related Art

During photography, photographing parameters (an aperture value, a shutter speed value, an ISO sensitivity value, an ND filter density value, and the like) may be manually adjusted while checking a photographed image on a monitor (an electronic view finder, a monitor built-in camera, an onset monitor, or the like). A photographed image refers to an image which is generated by photography and which represents an object. Photographing parameters refer to parameters which are set to a photographing apparatus and which are used for photography. By changing the photographing parameters, brightness and characteristics other than brightness of a photographed image can be changed.

The brightness of a photographed image depends on an exposure value set to the photographing apparatus. The exposure value depends on photographing parameters (specifically, a combination of a plurality of photographing parameters). For example, an increase in an aperture of a diaphragm, a reduction in shutter speed, an increase in ISO sensitivity, a reduction in ND filter density, and the like cause the exposure value to decrease and the brightness of the photographed image to increase.

Other characteristics (characteristics other than brightness) dependent on photographing parameters include a depth of field, a smoothness of movement, noise, blown-out highlights, and blocked-up shadows. The depth of field depends on the aperture value, the smoothness of movement depends on the shutter speed value, noise depends on the ISO sensitivity value, and blown-out highlights and blocked-up shadows depend on the exposure value. By suppressing a change in display brightness (brightness of a monitor) of a photographed image caused by a change in photographing parameters, the other characteristics described above can be more readily adjusted. For example, a case where the aperture value is adjusted in order to adjust the depth of field will be considered. In this case, by maintaining display brightness at prescribed brightness independent of the aperture value, a user can focus on adjusting the depth of field without having to pay attention to brightness.

Methods of setting the exposure value include manual exposure and automatic exposure. With manual exposure, all of the photographing parameters are set manually and an exposure value in accordance with a plurality of manually-set photographing parameters is set. With automatic exposure, a proper exposure value is determined based on a photometric value. In addition, in a case where one photographing parameter is changed manually, one or a plurality of other photographing parameters are automatically changed so that a proper exposure value is set as the exposure value. With automatic exposure, since the exposure value is maintained at a proper exposure value, data brightness of a photographed image (brightness represented by image data of the photographed image) and display brightness of the photographed image can be maintained.

As a technique for changing brightness of an image, a technique for automatically controlling display brightness by changing a gain value of image data, brightness (emission brightness) of a backlight unit, and the like based on a brightness histogram of image data or the like is proposed. In addition, in order to suppress blown-out highlights, a photographed image generated by photography at a low exposure value (underexposure) may be recorded and brightness of the photographed image may be increased in a subsequent editing process (color grading or the like).

As another technique for changing brightness of an image, a technique disclosed in Japanese Patent Application Laid-open No. 2013-16905 is proposed. With the technique disclosed in Japanese Patent Application Laid-open No. 2013-16905, a proper exposure value is determined based on a photometric value, blown-out highlights are detected based on a brightness histogram of photographed image data (image data of a photographed image), and an exposure value is changed to underexposure so as to suppress blown-out highlights. In addition, in order to suppress a change in display brightness due to a change in the exposure value, a gradation value of the photographed image data is increased by a gain value (gain increase).

SUMMARY OF THE INVENTION

With automatic exposure, there may be cases where brightness (data brightness or display brightness) of a photographed image, other characteristics of the photographed image, and the like do not assume a desired state. Therefore, manual exposure is often used in photography (such as filming) which emphasizes characteristics of a photographed image.

However, with manual exposure, in a case where one photographing parameters is changed, other photographing parameters remain unchanged. Therefore, a change in a photographing parameter may cause a change in brightness (data brightness or display brightness) of a photographed image. For example, a case where the aperture value is adjusted in order to adjust the depth of field will be considered. In this case, a change in the aperture value causes the display brightness to change to brightness which differs from desired brightness and makes it more difficult for a user to check the depth of field. In order to restore the display brightness to the prescribed brightness, photographing parameters other than the aperture value (a shutter speed value, an ISO sensitivity value, an ND filter density value, and the like) must be adjusted manually or a brightness setting of a monitor must be adjusted manually. Therefore, with a conventional method using manual exposure, a hassle (a load) on the user is large and adjustment of photographing parameters cannot be readily performed by the user. For example, the user cannot readily check the depth of field.

A conventional technique of automatically controlling display brightness based on a brightness histogram of image data eliminates the trouble of manually adjusting the display brightness. However, in a case of using such a conventional technique, display brightness may not always assume desired brightness. For example, in a case where photographing parameters are manually adjusted so that a bright photographed image (high key) or a dark photographed image (low key) is intentionally obtained, the display brightness does not assume desired brightness. With the technique disclosed in Japanese Patent Application Laid-open No. 2013-16905, a gain value is automatically determined based on a photometric value, a brightness histogram, and the like. Therefore, with the technique disclosed in Japanese Patent Application Laid-open No. 2013-16905, the display brightness does not assume desired brightness in a case where photographing parameters are desirably adjusted manually so that a high key or a low key is intentionally obtained.

The present invention in its first aspect provides an image processing apparatus, comprising:

a first acquiring unit configured to acquire first image data obtained by imaging of an object;

a second acquiring unit configured to acquire information related to a first exposure value used for imaging;

a setting unit configured to set any of a plurality of display modes including a first display mode and a second display mode; and a generating unit configured to generate, from the first image data, second image data corresponding to a display mode set by the setting unit, wherein in a case where the first display mode has been set by the setting unit, the generating unit generates second image data having brightness corresponding to the first exposure value, in a case where the second display mode has been set by the setting unit, the generating unit generates second image data having brightness corresponding to a second exposure value which differs from the first exposure value, and the second exposure value used in the second display mode is changeable in accordance with a user instruction.

The present invention in its second aspect provides an image processing method, comprising:

acquiring first image data obtained by imaging of an object;

acquiring information related to a first exposure value used for imaging;

setting any of a plurality of display modes including a first display mode and a second display mode; and generating, from the first image data, second image data corresponding to a set display mode, wherein in a case where the first display mode has been set, second image data having brightness corresponding to the first exposure value is generated, in a case where the second display mode has been set, second image data having brightness corresponding to a second exposure value which differs from the first exposure value is generated, and the second exposure value used in the second display mode is changeable in accordance with a user instruction.

The present invention in its third aspect provides a non-transitory computer readable medium that stores a program, wherein the program causes a computer to execute:

acquiring first image data obtained by imaging of an object;

acquiring information related to a first exposure value used for imaging;

setting any of a plurality of display modes including a first display mode and a second display mode; and generating, from the first image data, second image data corresponding to a set display mode, in a case where the first display mode has been set, second image data having brightness corresponding to the first exposure value is generated, in a case where the second display mode has been set, second image data having brightness corresponding to a second exposure value which differs from the first exposure value is generated, and the second exposure value used in the second display mode is changeable in accordance with a user instruction.

Further features of the present invention will become apparent from the following description of exemplary embodiments with reference to the attached drawings.

DESCRIPTION OF THE EMBODIMENTS

First Embodiment

Figure 1A:
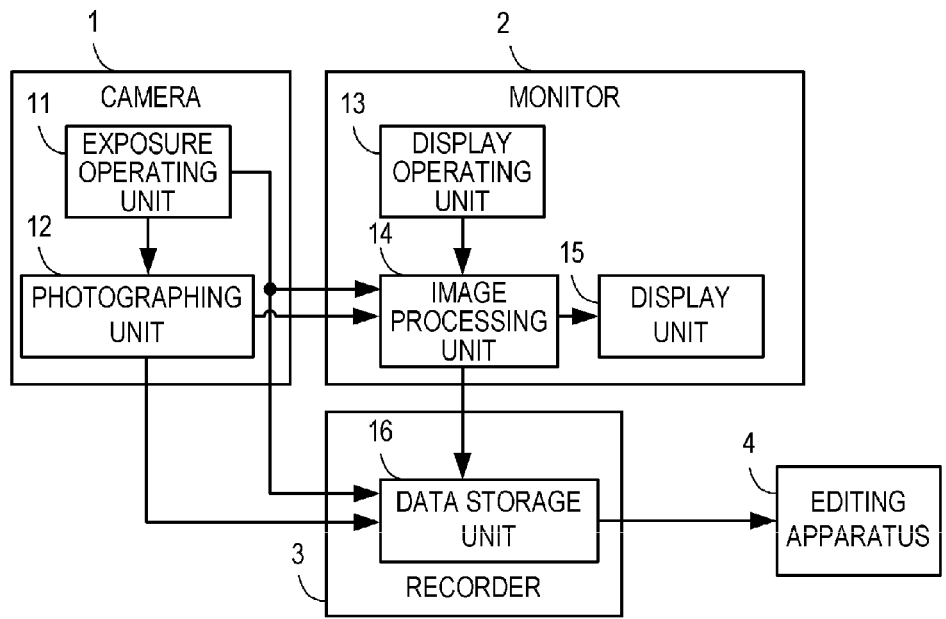
FIGS. 1A and 1B show configuration examples of an image editing system according to a first embodiment.
Figure 1B:
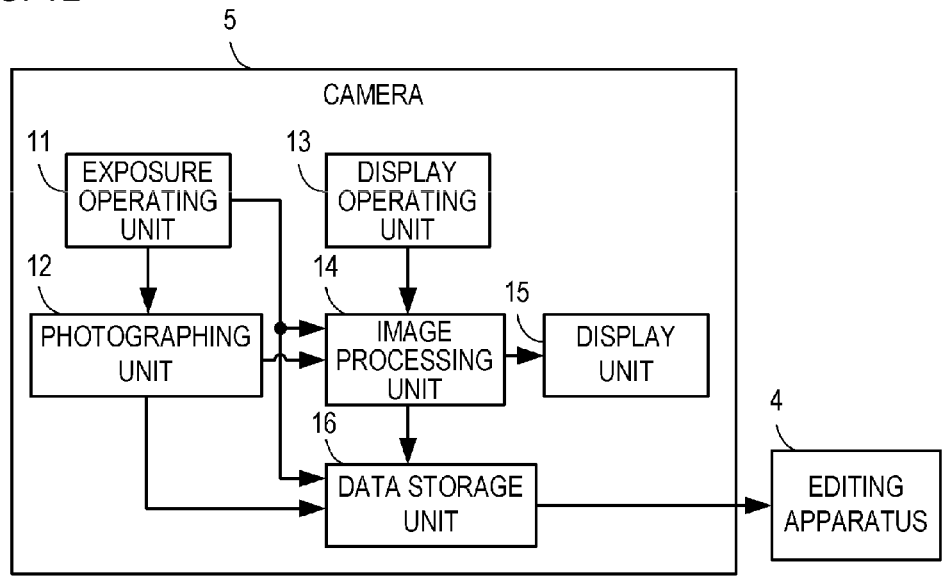

A first embodiment of the present invention will be described below. FIGS. 1A and 1B are block diagrams showing configuration examples of an image editing system according to the present embodiment.

In the example shown in FIG. 1A, the image editing system includes a camera (a photographing apparatus) 1, a monitor (a display apparatus) 2, a recorder (a recording apparatus) 3, and an editing apparatus 4.

The camera 1 generates photographed image data (image data representing an image of an object) by performing photography at a set exposure value. The camera 1 includes an exposure operating unit 11 and a photographing unit 12. The exposure operating unit 11 is an operating unit which accepts user operations for specifying photographing parameters (an aperture value, a shutter speed value, an ISO sensitivity value, an ND filter density value, and the like). The photographing unit 12 performs photography (reception of light from an object) at a set exposure value. Specifically, the photographing unit 12 performs photography based on set photographing parameters. As a result, photographed image data is generated. The photographing unit 12 includes a lens, an ND filter, a diaphragm, a shutter, an imaging sensor, a control unit (a control mechanism) which controls states of these components, and the like. The photographing unit 12 (the control unit) controls states of the lens, the ND filter, the diaphragm, the shutter, the imaging sensor, and the like so that the photographing parameters specified by a user are set. By setting the photographing parameters, an exposure value in accordance with the set photographing parameters is set. The exposure value depends on each of a plurality of photographing parameters (the aperture value, the shutter speed value, the ISO sensitivity value, and the ND filter density value). Moreover, the types and the number of photographing parameters are not particularly limited. Only the exposure value may be used as a photographing parameter.

The monitor 2 acquires photographed image data from the camera 1, performs image processing using the acquired photographed image data, and displays an image based on image data generated by image processing. The monitor 2 includes a display operating unit 13, an image processing unit 14, and a display unit 15. The display operating unit 13 accepts a user operation for specifying any of a plurality of display modes. The image processing unit 14 performs image processing in accordance with the display mode specified by the user to generate corresponding image data which corresponds to the display mode specified by the user from the photographed image data. The display unit 15 displays an image based on the corresponding image data.

The display operating unit 13 is, for example, a plurality of switching buttons respectively corresponding to the plurality of display modes or a single toggle switch for selecting any of the plurality of display modes. The switching buttons are buttons which allow a state of a corresponding display mode to be switched between enabled and disabled. Alternatively, a generic function button to which the function described is allocated may be used as the display operating unit 13.

The plurality of display modes include a relative brightness mode which is a first display mode and an absolute brightness mode which is a second display mode. The relative brightness mode is a display mode in which display brightness (brightness of the monitor 2 (the display unit 15)) is controlled to brightness in accordance with photographed image data. Specifically, the relative brightness mode is a display mode in which display brightness is controlled to brightness in accordance with a gradation value (an output value of an imaging sensor included in the photographing unit 12) of the photographed image data. The "relative brightness mode" may also be considered "a display mode in which display brightness is controlled to brightness in accordance with an amount of light received by the photographing unit 12". In addition, a correspondence relationship between the amount of received light and object brightness (brightness of an object) depends on the exposure value. Therefore, in the relative brightness mode, even if object brightness does not change, display brightness changes in a case where the exposure value of the camera 1 changes. In other words, a correspondence relationship between object brightness and display brightness depends on the exposure value of the camera 1. The absolute brightness mode is a display mode in which display brightness is controlled to brightness in accordance with object brightness. Therefore, in a case where object brightness does not change, display brightness does not change even if the exposure value of the camera 1 changes. However, in an image region where blown-out highlights or blocked-up shadows have occurred, a change in the exposure value of the camera 1 may cause display brightness to change.

The recorder 3 includes a data storage unit 16 and records photographed image data, exposure information, and the like in the data storage unit 16. Exposure information is information related to an exposure value used for photography. The editing apparatus 4 acquires the photographed image data recorded in the recorder 3 (the data storage unit 16) and edits the acquired photographed image data.

In the example shown in FIG. 1B, the image editing system includes a camera 5 and the editing apparatus 4. In addition, the display operating unit 13, the image processing unit 14, the display unit 15, and the data storage unit 16 are provided in the camera 5. Moreover, the configuration of the image editing system is not limited to the configurations shown in FIGS. 1A and 1B. Examples of conceivable configurations of the image editing system include a configuration constituted by a camera with a built-in recorder, a monitor, and an editing apparatus and a configuration constituted by a camera with a built-in monitor, a recorder, and an editing apparatus. In any configuration, the image processing unit 14 or an apparatus provided with the image processing unit 14 corresponds to the image processing apparatus according to the present invention.

Figure 2:
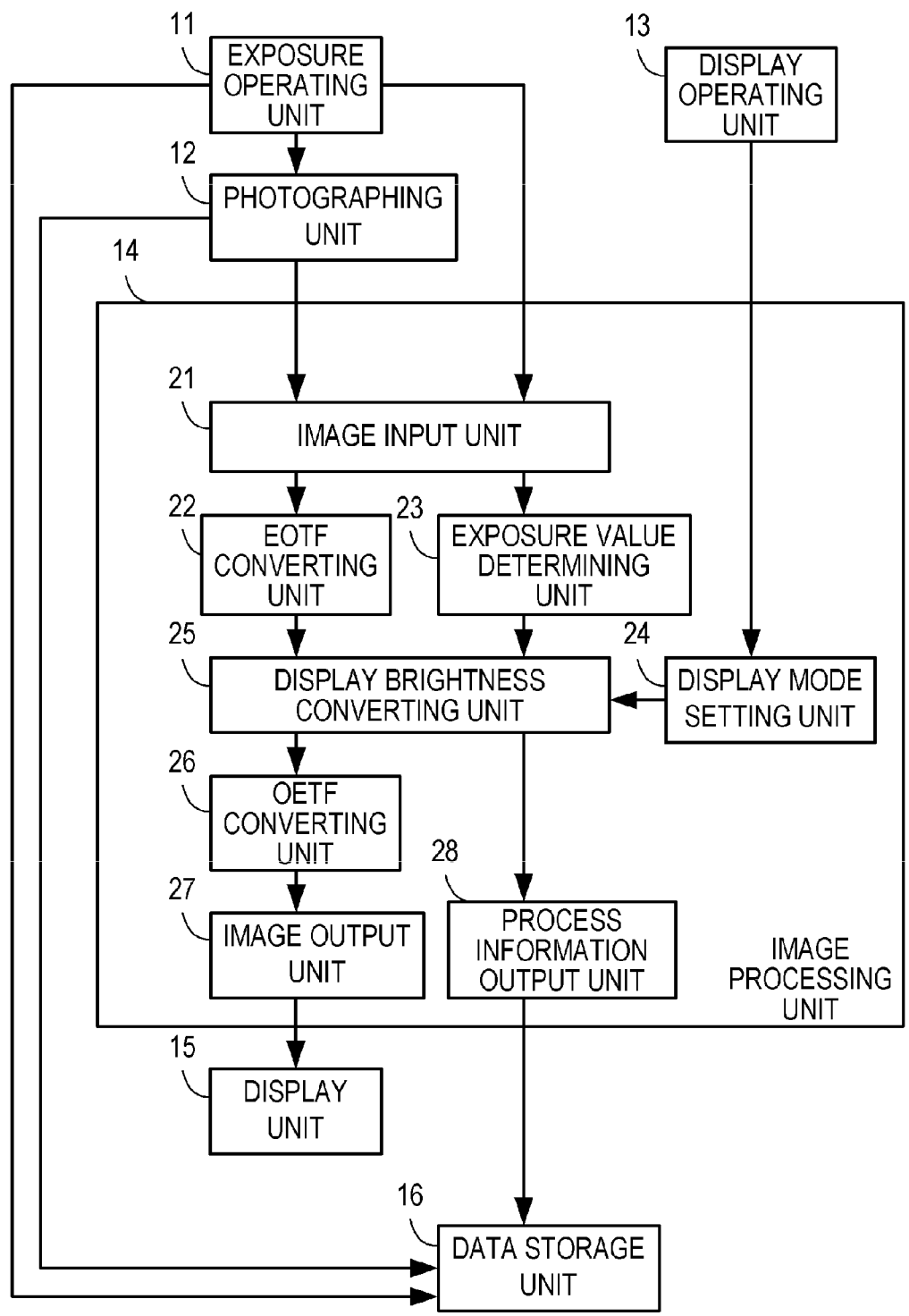
FIG. 2 shows a configuration example of an image processing unit according to the first embodiment.

FIG. 2 is a block diagram showing a configuration example of the image processing unit 14. Moreover, respective functional units of the image processing unit 101 may or may not be realized by hardware. For example, the monitor 2 may include a processor and a memory storing a control program. In addition, processes of at least a part of the functional units included in the image processing unit 14 may be realized by having the processor read the control program from the memory and execute the control program.

An image input unit 21 acquires photographed image data from the photographing unit 12 (a first acquisition process), converts a format of the acquired photographed image data into a prescribed format, and outputs the photographed image data with the converted format to an EOTF converting unit 22. While the prescribed format is not particularly limited, in the present embodiment, the prescribed format is an RGB 4:4:4 format in which the number of bits of a pixel value is 12 bits. For this reason, the photographed image data after format conversion is RGB image data. Therefore, the photographed image data after format conversion will be referred to as "RGB photographed image data". RGB photographed image data is "a plurality of pieces of photographed image data respectively corresponding to a plurality of types of gradation values". Specifically, RGB photographed image data is constituted by R photographed image data of which a gradation value is an R value, G photographed image data of which a gradation value is a G value, and B photographed image data of which a gradation value is a B value.

In addition, the image input unit 21 acquires exposure information from the exposure operating unit 11 (a second acquisition process) and records the acquired exposure information in an internal memory (not shown). Alternatively, exposure information may be included in attribute information (ancillary information) multiplexed to a blanking period of the photographed image data from the photographing unit 12. In this case, the image input unit 21 can acquire exposure information by extracting attribute information from the acquired photographed image data. While information indicating an exposure value may be used as exposure information, in the present embodiment, information indicating each of a plurality of photographing parameters is used as exposure information. The second acquisition process may be executed by a functional unit which differs from the functional unit executing the first acquisition process.

While gradation characteristics of RGB photographed image data are not particularly limited, in the present embodiment, RGB photographed image data has gradation characteristics in which gradation values (R value, G value, and B value) change non-linearly with respect to a change in an amount of received light (brightness as a physical quantity) of the photographing unit 12. The EOTF converting unit 22 is a characteristic converting unit which applies electro optical transfer function (EOTF) conversion to RGB photographed image data.

EOTF conversion is a process of converting image data having gradation characteristics (nonlinear characteristics) in which a gradation value changes non-linearly with respect to brightness as a physical quantity into image data having gradation characteristics (linear characteristics) in which a gradation value changes linearly with respect to brightness as a physical quantity. Specifically, EOTF conversion is a process of converting image data having nonlinear characteristics (nonlinear image data) into image data having linear characteristics (linear image data) by multiplying the nonlinear image data by an inverse function of the nonlinear characteristics. Therefore, RGB photographed image data after EOTF conversion will be described as "linear RGB photographed image data". The EOTF converting unit 22 outputs linear RGB photographed image data to a display brightness converting unit 25.

The EOTF converting unit 22 performs an EOTF conversion on each of an R value, a G value, and a B value. In other words, the EOTF converting unit 22 performs an EOTF conversion on each of R photographed image data, G photographed image data, and B photographed image data. The R photographed image data after EOTF conversion will be described as "linear R photographed image data", the G photographed image data after EOTF conversion will be described as "linear G photographed image data", and the B photographed image data after EOTF conversion will be described as "linear B photographed image data". Linear RGB photographed image data is constituted by linear R photographed image data, linear G photographed image data, and linear B photographed image data.

An exposure value determining unit 23 reads exposure information (a plurality of photographing parameters) from the internal memory and determines an exposure value based on the read exposure information. In addition, the exposure value determining unit 23 outputs the determined exposure value to the display brightness converting unit 25.

A display mode setting unit 24 sets any of the plurality of display modes. In addition, the display mode setting unit 24 records mode information indicating a present display mode (a display mode being set) in the internal memory. Specifically, the display mode setting unit 24 detects a user operation performed on the display operating unit 13 and sets a display mode specified by the user operation. In addition, the display mode setting unit 24 records information indicating the specified display mode as the mode information described above in the internal memory. Furthermore, in a case of detecting a user operation which specifies another display mode, the display mode setting unit 24 switches the set display mode to the other display mode and updates the display mode indicated by the mode information to the other display mode. Moreover, the display mode setting unit 24 may automatically set display modes.

The display brightness converting unit 25 acquires linear RGB photographed image data from the EOTF converting unit 22 and generates corresponding image data from the acquired linear RGB photographed image data. While a format of the corresponding image data is not particularly limited, in the present embodiment, corresponding image data which is RGB image data (RGB corresponding image data) is generated from linear RGB photographed image data. The display brightness converting unit 25 outputs RGB corresponding image data to an OETF converting unit 26.

The display brightness converting unit 25 generates corresponding image data for each of an R value, a G value, and a B value. In other words, the display brightness converting unit 25 generates, from linear R photographed image data, R corresponding image data which corresponds to R photographed image data and linear R photographed image data and of which a gradation value is an R value. The display brightness converting unit 25 generates, from linear G photographed image data, G corresponding image data which corresponds to G photographed image data and linear G photographed image data and of which a gradation value is a G value. In addition, the display brightness converting unit 25 generates, from linear B photographed image data, B corresponding image data which corresponds to B photographed image data and linear B photographed image data and of which a gradation value is a B value. RGB corresponding image data is constituted by R corresponding image data, G corresponding image data, and B corresponding image data.

In the present embodiment, in a relative brightness period, the display brightness converting unit 25 generates image data which realizes display brightness corresponding to a present exposure value (a first exposure value) as RGB corresponding image data. Specifically, in the relative brightness period, the display brightness converting unit 25 generates image data which realizes display brightness in accordance with photographed image data (a gradation value of photographed image data; an amount of received light). The relative brightness period is a period (a first period) in which the relative brightness mode is being set. As described earlier, in a case where display brightness is controlled to brightness in accordance with photographed image data, a correspondence relationship between object brightness and display brightness depends on the exposure value. In consideration thereof, in the present embodiment, in an absolute brightness period, the display brightness converting unit 25 generates RGB corresponding image data by correcting photographed image data (linear RGB photographed image data) based on a change in an exposure value up to the present. The absolute brightness period is a period (a second period) from a timing at which the set display mode is switched from the relative brightness mode to the absolute brightness mode. Specifically, in the absolute brightness period, the display brightness converting unit 25 corrects linear RGB photographed image data so that the display brightness to be realized approaches display brightness corresponding to an exposure value (a second exposure value) at the timing described above from display brightness corresponding to a present exposure value. Linear RGB photographed image data is corrected based on a change in the exposure value from the timing described above up to the present. In the absolute brightness period, a change in display brightness (a change from display brightness at the timing described above (an end point of the relative brightness period)) caused by a change in the exposure value can be suppressed.

While a method of generating RGB corresponding image data is not particularly limited, in the present embodiment, the display brightness converting unit 25 generates RGB corresponding image data by multiplying each gradation value of linear RGB photographed image data by a display brightness gain value which is an image processing parameter (a correction parameter). As a result, linear image data is generated as RGB corresponding image data. The display brightness converting unit 25 determines the display brightness gain value based on a present display mode, an exposure value (a change in the exposure value up to the present), and the like.

The OETF converting unit 26 applies optical electro transfer function (OETF) conversion to RGB corresponding image data. OETF conversion is a process of converting linear image data into nonlinear image data. Specifically, OETF conversion is a process of converting linear image data into nonlinear image data by multiplying the linear image data by a function of the nonlinear characteristics. Therefore, RGB corresponding image data after OETF conversion will be described as "nonlinear RGB corresponding image data". The OETF converting unit 26 outputs nonlinear RGB corresponding image data to an image output unit 27.

The OETF converting unit 26 performs an OETF conversion on each of an R value, a G value, and a B value. In other words, the OETF converting unit 26 performs an OETF conversion on each of R corresponding image data, G corresponding image data, and B corresponding image data. The R corresponding image data after OETF conversion will be described as "nonlinear R corresponding image data", the G corresponding image data after OETF conversion will be described as "nonlinear G corresponding image data", and the B corresponding image data after OETF conversion will be described as "nonlinear B corresponding image data". Nonlinear RGB corresponding image data is constituted by nonlinear R corresponding image data, nonlinear G corresponding image data, and nonlinear B corresponding image data.

As the function of the nonlinear characteristics described above, the OETF converting unit 26 uses an inverse function of display characteristics of the display unit 15 (a correspondence relationship between an input value of the display unit 15 and display brightness of the display unit 15). Therefore, in the gradation characteristics of nonlinear RGB corresponding image data, "brightness as a physical quantity" means "display brightness". The process performed by the display brightness converting unit 25 enables a dynamic range of display brightness to be enlarged (extended). In consideration thereof, preferably, a display unit accommodating high dynamic range (HDR) which is an extremely wide dynamic range is used and OETF conversion corresponding to HDR (for example, the OETF conversion defined by the SMPTE ST 2084 standard) is performed.

The image output unit 27 generates display image data by converting a format of the nonlinear RGB corresponding image data into a prescribed format. In addition, the image output unit 27 outputs the display image data to the display unit 15.

A process information output unit 28 records information (process information) used in a process performed with respect to photographed image data (correction of photographed image data) in the data storage unit 16 in association with the photographed image data. As process information, for example, a display brightness gain value or information used for determining the display brightness gain value (mode information, photographing parameters, an exposure value, or the like) is recorded. Accordingly, in a case of editing photographed image data, by performing an EOTF process and multiplication by a display brightness gain value with respect to the photographed image data, display brightness of the display unit 15 at the time of photography can be reproduced. Alternatively, the process information output unit 28 may be omitted.

Input and output data of each functional unit will not be described with reference to FIGS. 3A to 3H.

Figure 3A:
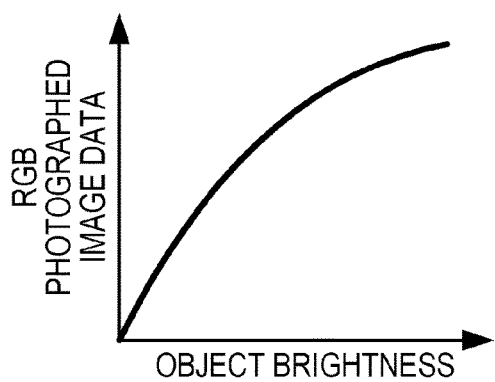
FIGS. 3A to 3H show examples of characteristics according to the first embodiment.

FIG. 3A shows an example of gradation characteristics of RGB photographed image data which is output data of the image input unit 21. In the gradation characteristics shown in FIG. 3A, object brightness corresponds to an amount of received light belonging to a dynamic range of an amount of light received by the photographing unit 12 (an imaging sensor). Therefore, the "object brightness" in FIG. 3A can be rephrased as the "amount of received light". In the photographing unit 12, object brightness higher than object brightness corresponding to an upper limit value of the amount of received light is handled as same object brightness as the object brightness corresponding to the upper limit value of the amount of received light. As shown in FIG. 3A, the gradation characteristics of RGB photographed image data are nonlinear characteristics in which a gradation value changes non-linearly with respect to a change in object brightness (the amount of received light). Photographed image data which is output data of the photographing unit also has gradation characteristics similar to the gradation characteristics of RGB photographed image data.

Figure 3B:
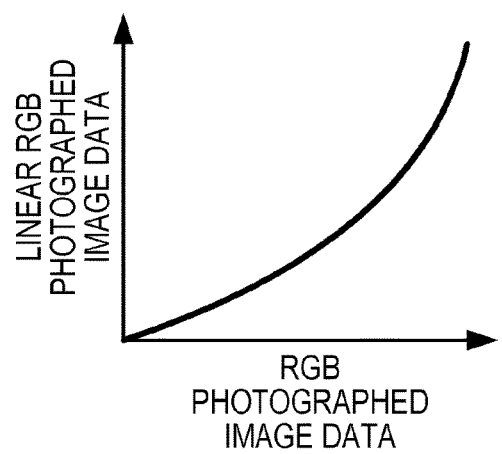

FIG. 3B shows an example of a correspondence relationship between a gradation value of RGB photographed image data which is input data of the EOTF converting unit 22 and a gradation value of linear RGB photographed image data which is output data of the EOTF converting unit 22. As shown in FIG. 3B, with respect to a change in the gradation value of RGB photographed image data, the gradation value of linear RGB photographed image data changes nonlinearly.

Figure 3C:
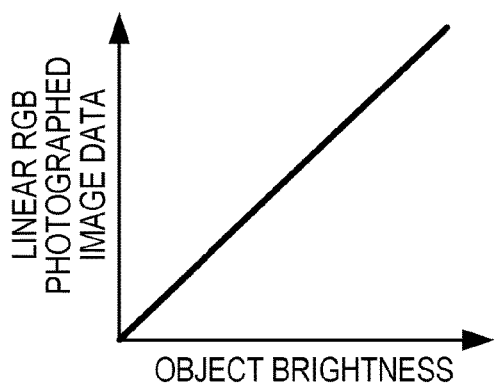

FIG. 3C shows an example of gradation characteristics of linear RGB photographed image data. A function of the correspondence relationship shown in FIG. 3B is an inverse function of the nonlinear characteristics shown in FIG. 3A. Therefore, as shown in FIG. 3C, the gradation characteristics of linear RGB photographed image data are linear characteristics in which a gradation value changes linearly with respect to a change in object brightness (the amount of received light).

Figure 3D:
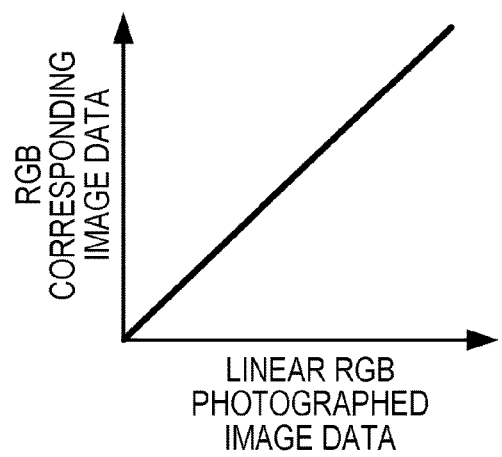

FIG. 3D shows an example of a correspondence relationship between a gradation value of linear RGB photographed image data which is input data of the display brightness converting unit 25 and a gradation value of RGB corresponding image data which is output data of the display brightness converting unit 25. In the present embodiment, RGB corresponding image data is generated by multiplying each gradation value of linear RGB photographed image data by a display brightness gain value. Therefore, as shown in FIG. 3D, with respect to a change in the gradation value of linear RGB photographed image data, the gradation value of RGB corresponding image data changes linearly.

Figure 3E:
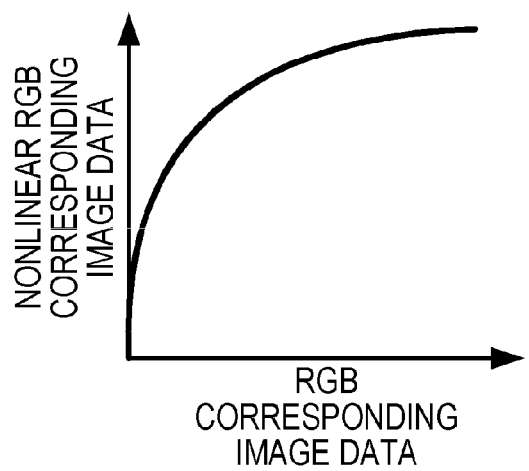

FIG. 3E shows an example of a correspondence relationship between a gradation value of RGB corresponding image data which is input data of the OETF converting unit 26 and a gradation value of nonlinear RGB corresponding image data which is output data of the OETF converting unit 26. As shown in FIG. 3E, with respect to a change in the gradation value of RGB corresponding image data, the gradation value of nonlinear RGB corresponding image data changes non-linearly.

Figure 3F:
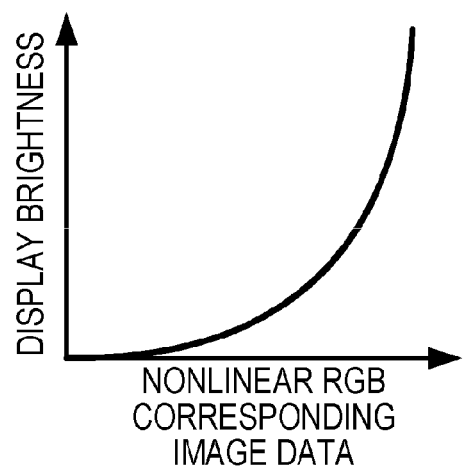

FIG. 3F shows an example of display characteristics of the display unit 15. Specifically, FIG. 3F shows an example of a correspondence relationship between a gradation value of nonlinear RGB corresponding image data and display brightness. As shown in FIG. 3F, the display characteristics of the display unit 15 are nonlinear characteristics in which display brightness changes non-linearly with respect to a change in a gradation value.

Figure 3G:
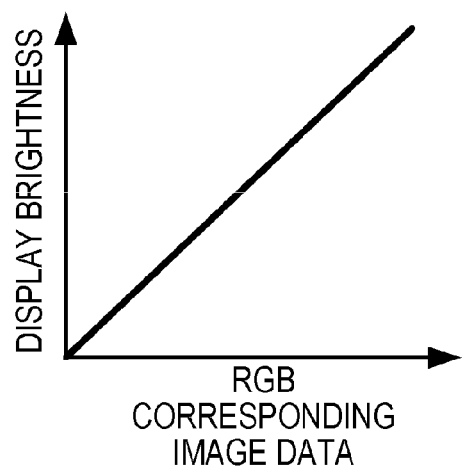

FIG. 3G shows an example of gradation characteristics of RGB corresponding image data. A function of the display characteristics shown in FIG. 3F is an inverse function of the correspondence relationship shown in FIG. 3E. Therefore, as shown in FIG. 3G, the gradation characteristics of RGB corresponding image data are linear characteristics in which display brightness changes linearly with respect to a change in a gradation value.

Figure 3H:
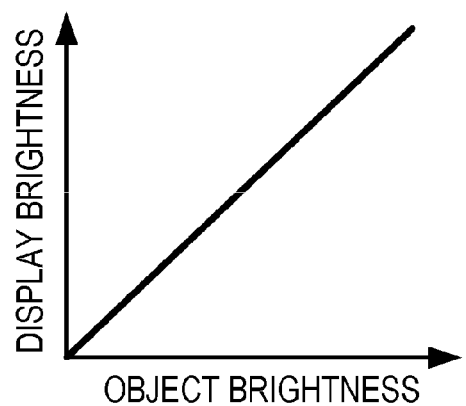

FIG. 3H shows an example of a correspondence relationship between object brightness (an amount of received light) and display brightness. Based on the gradation characteristics shown in FIG. 3C and the gradation characteristics shown in FIG. 3G, display brightness changes linearly with respect to a change in object brightness (the amount of received light) as shown in FIG. 3H.

A process flow of the image processing unit 14 will be described with reference to the flow chart shown in FIG. 4.

Figure 4:
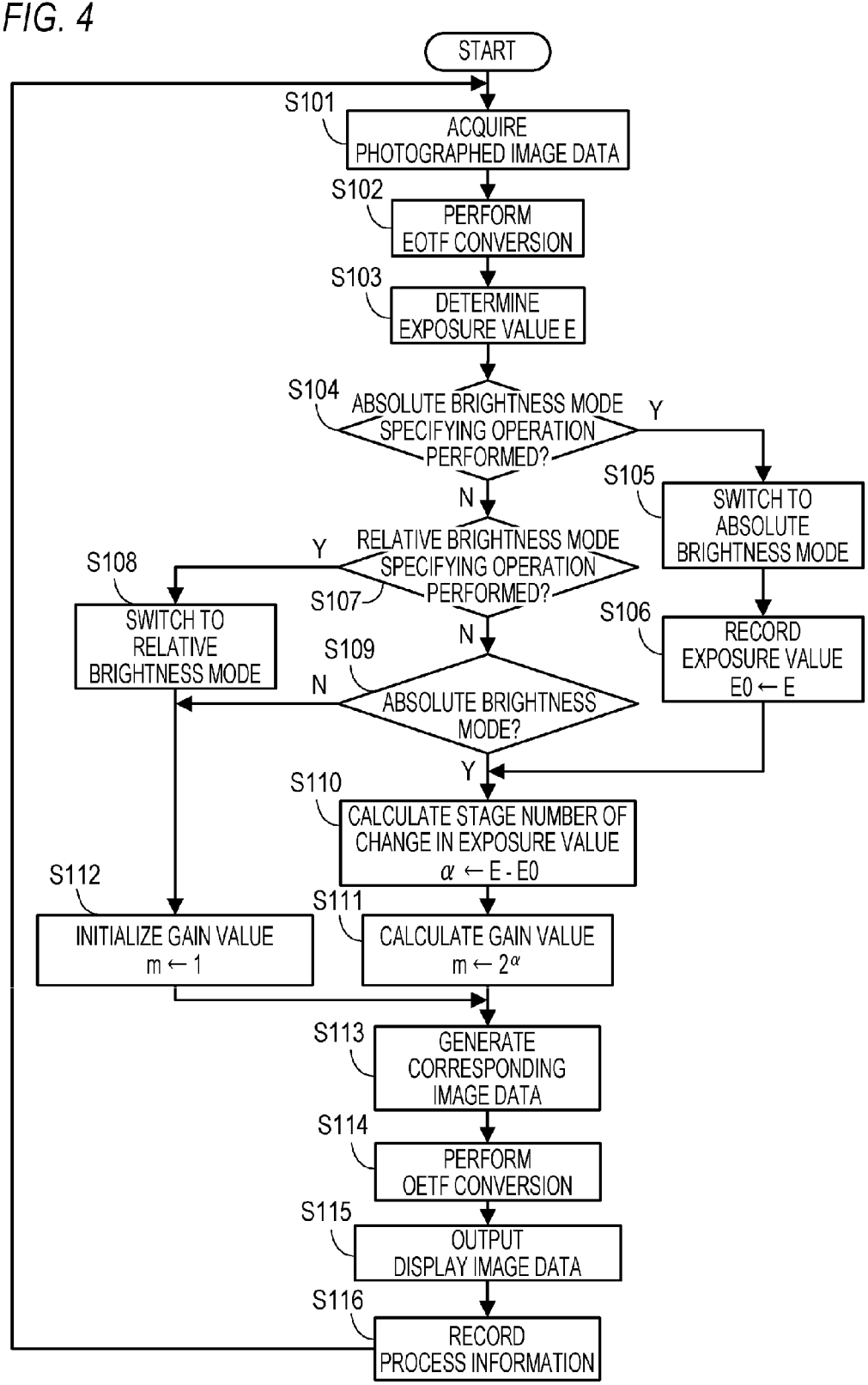
FIG. 4 shows an example of a processing flow of the image processing unit according to the first embodiment.

In the present embodiment, the image processing unit 14 executes the flow chart shown in FIG. 4 for each frame. To this end, the image processing unit 14 performs, for each frame, a process involving acquiring photographed image data and exposure information and generating corresponding image data from the acquired photographed image data. Moreover, a frequency of acquiring the photographed image data, a frequency of acquiring the exposure information, a frequency of generating the corresponding image data, and the like are not particularly limited. At least any one of the three frequencies described above may differ from the other two frequencies. For example, photographed image data may be acquired in only case where the photographed image data is updated. Exposure information may be acquired in only case where the exposure information is updated. Corresponding image data may be generated in only case where at least one of the photographed image data and the exposure information is updated.

In S101, the image input unit 21 acquires photographed image data corresponding to one frame from the photographing unit 12 and converts the acquired photographed image data into RGB photographed image data (RGB image data in an RGB 4:4:4 format). In addition, the image input unit 21 acquires exposure information corresponding to the acquired photographed image data (present exposure information; exposure information corresponding to the present frame) from the exposure operating unit 11.

The photographed image data acquired from the photographing unit 12 is, for example, a plurality of pieces of photographed image data respectively corresponding to a plurality of types (three types, four types, or the like) of gradation values. Specifically, the photographed image data acquired from the photographing unit 12 is RGB image data, YCbCr image data, XYZ image data, RAW (RGGB) image data, or the like. In addition, each gradation value of the photographed image data acquired from the photographing unit 12 is, for example, a gradation value quantized to a 10-bit value (0 to 1023), a 12-bit value (0 to 4095), or the like. Furthermore, each gradation value of the photographed image data acquired from the photographing unit 12 is a gradation value obtained by multiplying brightness as a physical quantity by a nonlinear function (for example, a logarithmic (LOG) function).

In a case where the photographed image data acquired from the photographing unit 12 is YCbCr image data, XYZ image data, or the like, the photographed image data is converted into RGB photographed image data by, for example, a prescribed matrix operation. In a case where the photographed image data acquired from the photographing unit 12 is YCbCr image data in a YCbCr 4:2:2 format, the photographed image data is converted into YCbCr image data in a YCbCr 4:4:4 format by an interpolation process. Subsequently, the YCbCr image data in the YCbCr 4:4:4 format is converted into RGB photographed image data. In a case where the photographed image data acquired from the photographing unit 12 is RGB image data in an RGB 4:4:4 format, conversion into RGB photographed image data is omitted and the acquired photographed image data is used as RGB photographed image data.

Subsequently, the process is advanced to S102. Processes of S102 and thereafter are performed for each of an R value, a G value, and a B value.

In S102, the EOTF converting unit 22 generates linear RGB photographed image data by applying EOTF conversion to the RGB photographed image data acquired in S101. A type of the EOTF conversion, parameters of the EOTF conversion, and the like are determined based on the exposure information acquired in S101. For example, in a case where photographed image data multiplied by a LOG function is obtained and the photographed image data is converted into RGB photographed image data multiplied by the LOG function, an EOTF conversion involving multiplication by an inverse function of the LOG function is performed. The EOTF conversion may be an arithmetic process using a calculating unit or a conversion process which involves referring to a lookup table.

Next, in S103, the exposure value determining unit 23 determines a present exposure value (an exposure value corresponding to a present frame) E from the exposure information acquired in S101. In the present embodiment, the exposure value determining unit 23 determines a stage number of the exposure value for each photographing parameter included in the exposure information and determines a sum value of the determined stage numbers as the exposure value E. The stage number is a value determined such that, in a case where the stage number increases by one stage, brightness (display brightness corresponding to a gradation value of photographed image data) is reduced by a factor of 1/2 times. Exposure information includes, as photographing parameters, an aperture value, a shutter speed value, an ISO sensitivity value, an ND filter density value, and the like.

For example, an exposure value E=0 is determined in a case where aperture value=F1.0, shutter speed value=1 second, ISO sensitivity value=ISO3, and ND filter density value=ND1 (no ND filter). Each time the aperture value increases by a factor of 1.4 times, the stage number of the exposure value E increases by one stage (the brightness decreases by a factor of 1/2 times). Each time the shutter speed value (a numeric value in seconds) decreases by a factor of 1/2 times, the stage number of the exposure value E increases by one stage. Moreover, in this case, it is assumed that the smaller the shutter speed value, the higher the shutter speed. Each time the ISO sensitivity value decreases by a factor of 1/2 times, the stage number of the exposure value E increases by one stage. In addition, each time the ND filter density value increases by a factor of 2 times, the stage number of the exposure value E increases by one stage. On the other hand, each time the aperture value decreases by a factor of 1/1.4 times, the stage number of the exposure value E decreases by one stage (the brightness increases by a factor of 2 times). Each time the shutter speed value (a numeric value in seconds) increases by a factor of 2 times, the stage number of the exposure value E decreases by one stage. Each time the ISO sensitivity value increases by a factor of 2 times, the stage number of the exposure value E decreases by one stage. In addition, each time the ND filter density value decreases by a factor of 1/2 times, the stage number of the exposure value E decreases by one stage.

In addition, in S104, the display mode setting unit 24 determines whether or not an absolute brightness mode specifying operation (a user operation for specifying the absolute brightness mode) has been performed. In a case where an absolute brightness mode specifying operation has been performed, the process advances to S105. In a case where an absolute brightness mode specifying operation has not been performed, the process advances to S107.

In S105, the display mode setting unit 24 switches the set display mode to the absolute brightness mode. In addition, the display mode setting unit 24 records mode information indicating the absolute brightness mode in the internal memory. Specifically, the display mode indicated by the mode information is updated to the absolute brightness mode. In a case where the absolute brightness mode is already set, switching of the set display mode and updating of mode information are omitted.

Following S105, in S106, the display brightness converting unit 25 records the exposure value E of the current frame (the present frame) in the internal memory as an exposure value E0. The process of S106 is executed in only case where the set display mode is switched from the relative brightness mode to the absolute brightness mode. Therefore, the exposure value E0 is an exposure value of a timing at which the set display mode is switched from the relative brightness mode to the absolute brightness mode. Following S106, the process is advanced to S110.

In S107, the display mode setting unit 24 determines whether or not a relative brightness mode specifying operation (a user operation for specifying the relative brightness mode) has been performed. In a case where a relative brightness mode specifying operation has been performed, the process advances to S108. In a case where a relative brightness mode specifying operation has not been performed, the process advances to S109.

In S108, the display mode setting unit 24 switches the set display mode to the relative brightness mode. In addition, the display mode setting unit 24 records mode information indicating the relative brightness mode in the internal memory. Specifically, the display mode indicated by the mode information is updated to the relative brightness mode. In a case where the relative brightness mode is already set, switching of the set display mode and updating of mode information are omitted. Following S108, the process is advanced to S112.

In S109, the display mode setting unit 24 determines whether the present display mode is the absolute brightness mode or the relative brightness mode. Specifically, the display mode setting unit 24 reads mode information from the internal memory and determines whether the display mode indicated by the mode information (the present display mode) is the absolute brightness mode or the relative brightness mode. In a case where the present display mode is the absolute brightness mode, the process is advanced to S110. In a case where the present display mode is the relative brightness mode, the process is advanced to S112.

In S110, the display brightness converting unit 25 calculates a difference $\alpha$ between the exposure value E of the current frame and the exposure value E0 of a timing at which the set display mode is switched from the relative brightness mode to the absolute brightness mode. In the present embodiment, the difference $\alpha$ is obtained by subtracting the exposure value E0 from the exposure value E. Therefore, the difference $\alpha$ is a stage number corresponding to a change in the exposure value from the timing described above up to the present. For example, in a case where exposure value E0=10 and exposure value E=12, difference $\alpha=12-10=2$ is obtained. Difference $\alpha=2$ means that the exposure value has increased by two stages from the timing described above up to the present. In a case where exposure value E0=10 and exposure value E=7, difference $\alpha=7-10=-3$ is obtained. Difference $\alpha=-3$ means that the exposure value has decreased by three stages from the timing described above up to the present.

Following S110, in S111, the display brightness converting unit 25 determines $2^\alpha$ as a display brightness gain value m of the current frame. Following S110, the process is advanced to S113.

In S112, the display brightness converting unit 25 determines 1 as the display brightness gain value m of the current frame (initialization of the display brightness gain value). Following S112, the process is advanced to S113.

In S113, the display brightness converting unit 25 generates RGB corresponding image data by multiplying each gradation value of the linear RGB photographed image data generated in S102 by the display brightness gain value m of the current frame. Next, in S114, the OETF converting unit 26 generates nonlinear RGB corresponding image data by applying OETF conversion to the RGB corresponding image data generated in S113. The OETF conversion may be an arithmetic process using a calculating unit or a conversion process which involves referring to a lookup table.

In addition, in S115, the image output unit 27 converts the nonlinear RGB corresponding image data generated in S114 into display image data and outputs the display image data to the display unit 15. As a result, an image based on the display image data of the current frame is displayed by the display unit 15. Next, in S116, the process information output unit 28 records the display brightness gain value m of the current frame as process information in the data storage unit 16 in association with the photographed image data of the current frame. Subsequently, the process is returned to S101 and processes on a next frame are performed.

The process of S112 is performed during a relative brightness period. Therefore, in the relative brightness period, same image data as linear RGB photographed image data is generated as RGB corresponding image data using display brightness gain value m=1. Moreover, in the relative brightness period, the process of multiplying the linear RGB photographed image data by the display brightness gain value m may be omitted.

The processes of S110 and S111 are performed during an absolute brightness period. Therefore, in the absolute brightness period, photographed image data (linear RGB photographed image data) is corrected based on a change in the exposure value from a timing at which the set display mode is switched from the relative brightness mode to the absolute brightness mode up to the present. As a result, RGB corresponding image data is generated. Specifically, the display brightness gain value m is determined based on the change in the exposure value from the timing described above up to the present, and RGB corresponding image data is generated by multiplying each gradation value of linear RGB photographed image data by the determined display brightness gain value m.

Moreover, in S116, the difference $\alpha$ may be used as process information. In this case, in S112, a process of determining 0 as the difference $\alpha$ is further performed. Accordingly, in a case of editing photographed image data, display brightness gain value $m=2^\alpha$ can be calculated from the difference $\alpha$ and used. In addition, in S116, mode information may be used as process information.

Accordingly, in a case of editing photographed image data, the difference $\alpha$ and the display brightness gain value m can be calculated and used in accordance with the display mode by applying the flow chart shown in FIG. 4. The exposure value E of each frame is determined based on, for example, photographing parameters multiplexed on photographed image data.

Figure 5A:
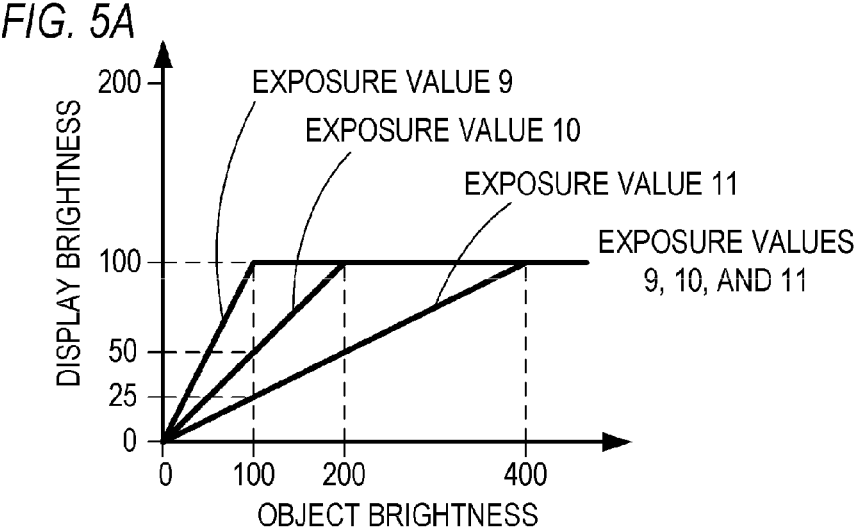
FIGS. 5A to 5C show examples of a correspondence relationship (between object brightness and display brightness) according to the first embodiment.
Figure 5B:
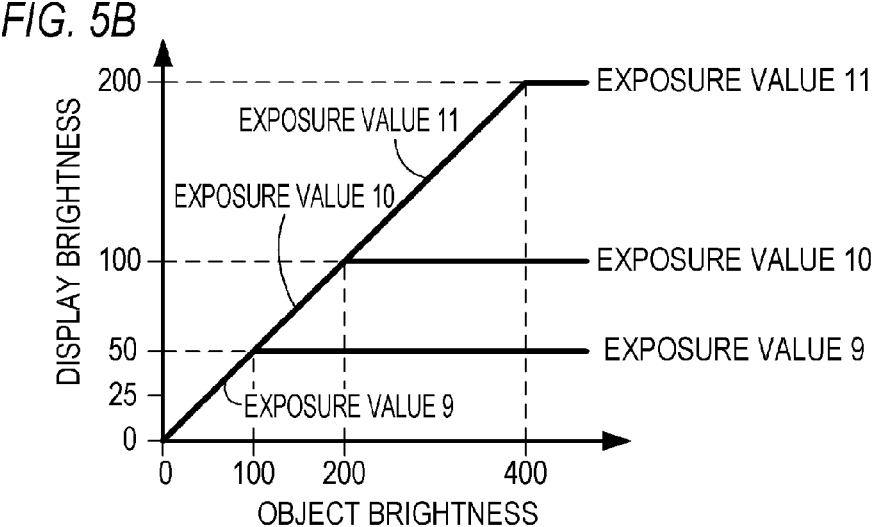
Figure 5C:
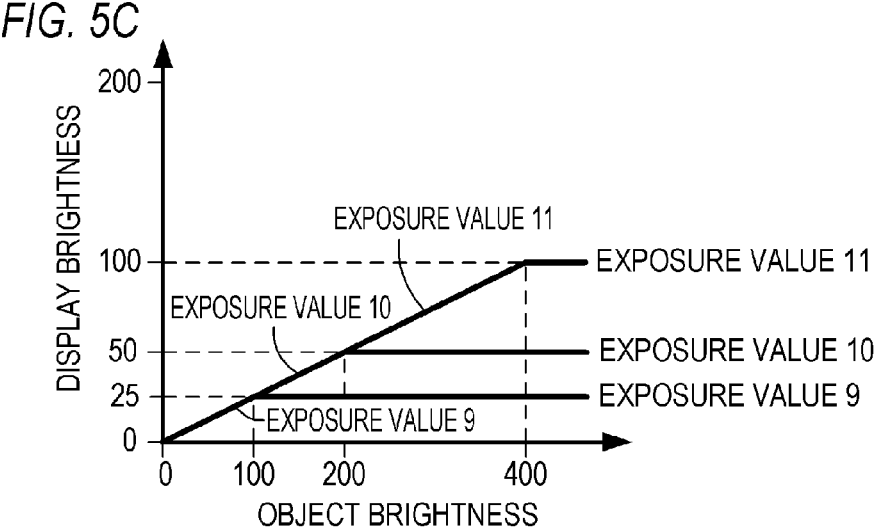

A correspondence relationship between object brightness and display brightness will be described using FIGS. 5A to 5C. As shown in FIGS. 5A to 5C, in a dynamic range of an amount of received light of the photographing unit 12, display brightness increases linearly with respect to an increase in object brightness corresponding to the amount of received light. In addition, in the photographing unit 12, object brightness higher than object brightness corresponding to an upper limit value of the amount of received light is handled as same object brightness as the object brightness corresponding to the upper limit value of the amount of received light. Therefore, once object brightness is equal to or higher than the object brightness corresponding to the upper limit value of the amount of received light, display brightness becomes constant (saturation of display brightness). Specifically, same display brightness as display brightness corresponding to the object brightness at the upper limit value of the amount of received light is obtained as display brightness corresponding to object brightness which is higher than the object brightness of the upper limit value of the amount of received light.

Moreover, the dynamic range described above may differ among a plurality of color components (for example, red, green, and blue) of a color filter of the photographing unit 12 (an imaging sensor) and the correspondence relationships described earlier may differ among the plurality of types of gradation values. In addition, in the photographing unit 12, object brightness lower than object brightness corresponding to a lower limit value of the amount of received light is handled as same object brightness as the object brightness corresponding to the lower limit value of the amount of received light. Therefore, even when object brightness falls below the object brightness corresponding to the lower limit value of the amount of received light, display brightness becomes constant. Specifically, same display brightness as display brightness corresponding to the object brightness at the lower limit value of the amount of received light is obtained as display brightness corresponding to object brightness which is higher than the object brightness of the lower limit value of the amount of received light. However, these points will be ignored below for the sake of brevity.

FIG. 5A shows an example of a correspondence relationship corresponding to the relative brightness mode. In the relative brightness mode, display brightness in accordance with a gradation value of photographed image data (a gradation value of linear RGB photographed image data; an amount of received light) is realized. In addition, a correspondence relationship between the amount of received light and object brightness depends on an exposure value. Therefore, in a case where the object brightness is constant, display brightness increases by decreasing the exposure value (increasing the amount of received light). Accordingly, in the relative brightness mode, in a linear characteristic portion (a range corresponding to a dynamic range of an amount of received light; a range in which display brightness increases linearly with respect to an increase in object brightness), an inclination of change in display brightness with respect to a change in object brightness depends on an exposure value. At an exposure value of 9 shown in FIG. 5A, display brightness corresponding to object brightness of 100 is 100. At an exposure value of 10, display brightness corresponding to object brightness of 100 is 50. Furthermore, at an exposure value of 11, display brightness corresponding to object brightness of 100 is 25.

In addition, in the relative brightness mode, prescribed brightness (in the example shown in FIG. 5A, 100) not dependent on the exposure value is obtained as display brightness corresponding to an upper limit value of the amount of received light (an upper limit value of a gradation value of photographed image data; an upper limit value of a gradation value of linear RGB photographed image data). The smaller the exposure value, the lower the object brightness corresponding to the upper limit value of the amount of received light. Furthermore, in the photographing unit 12, object brightness higher than object brightness corresponding to an upper limit value of the amount of received light is handled as same object brightness as the object brightness corresponding to the upper limit value of the amount of received light. Therefore, the smaller the exposure value, the more likely blown-out highlights are to occur. "Object brightness corresponding to the upper limit value of the amount of received light" may be rephrased as "object brightness at which display brightness saturates". At the exposure value of 9 shown in FIG. 5A, display brightness saturates in a case where object brightness is equal to or higher than 100. At the exposure value of 10, display brightness saturates in a case where object brightness is equal to or higher than 200. Furthermore, at the exposure value of 11, display brightness saturates in a case where object brightness is equal to or higher than 400. A correspondence relationship among a dynamic range of an amount of received light, an exposure value, and object brightness at which display brightness saturates depends on performance of the photographing unit 12 (an imaging sensor). Therefore, the numerical values described above are merely examples.

FIGS. 5B and 5C show examples of a correspondence relationship corresponding to the absolute brightness mode. In the absolute brightness mode, a gradation value of linear RGB photographed image data is multiplied by a display brightness gain value which cancels a change in an amount of received light caused by a change in an exposure value and display brightness is determined in accordance with the gradation value after multiplication. Therefore, in a case where object brightness is constant, display brightness does not change even if the exposure value changes. Accordingly, in the absolute brightness mode, in a linear characteristic portion, an inclination of change in display brightness with respect to a change in object brightness does not depend on the exposure value.

FIG. 5B shows an example of a case where an exposure value of 10 is set in the relative brightness mode and the display mode is switched from the relative brightness mode to the absolute brightness mode. In a case where the exposure value is changed from 10 to 9 in the absolute brightness mode, the amount of received light increases by a factor of 2 times. Therefore, in the absolute brightness mode, in order to cancel such a change, the display brightness is reduced to 1/2 times the display brightness in the relative brightness mode. As a result, as is apparent from FIGS. 5A and 5B, an inclination of a linear characteristic portion corresponding to the exposure value of 9 is reduced by a factor of 1/2 times and matches an inclination of a linear characteristic portion corresponding to the exposure value of 10.

In addition, in a case where the exposure value is changed from 10 to 11 in the absolute brightness mode, the amount of received light decreases by a factor of 1/2 times. Therefore, in the absolute brightness mode, in order to cancel such a change, the display brightness is increased to 2 times the display brightness in the relative brightness mode. As a result, as is apparent from FIGS. 5A and 5B, an inclination of a linear characteristic portion corresponding to the exposure value of 11 is increased by a factor of 2 times and matches the inclination of the linear characteristic portion corresponding to the exposure value of 10.

FIG. 5C shows an example of a case where the exposure value of 11 is set in the relative brightness mode and the display mode is switched from the relative brightness mode to the absolute brightness mode. In a case where the exposure value is changed from 11 to 9 in the absolute brightness mode, the amount of received light increases by a factor of 4 times. Therefore, in the absolute brightness mode, in order to cancel such a change, the display brightness is reduced to 1/4 times the display brightness in the relative brightness mode. As a result, as is apparent from FIGS. 5A and 5C, the inclination of the linear characteristic portion corresponding to the exposure value of 9 is reduced by a factor of 1/4 times and matches the inclination of the linear characteristic portion corresponding to the exposure value of 11.

In addition, in a case where the exposure value is changed from 11 to 10 in the absolute brightness mode, the amount of received light increases by a factor of 2 times. Therefore, in the absolute brightness mode, in order to cancel such a change, the display brightness is reduced to 1/2 times the display brightness in the relative brightness mode. As a result, as is apparent from FIGS. 5A and 5C, the inclination of the linear characteristic portion corresponding to the exposure value of 10 is reduced by a factor of 1/2 times and matches the inclination of the linear characteristic portion corresponding to the exposure value of 11.

The description of FIGS. 5B and 5C will now be generalized. In a case where the exposure value is increased by $\alpha$-number of stages, the amount of received light decreases by a factor of $1/(2^{\alpha})$ times. Therefore, in order to cancel such a change, the display brightness is increased to $2^{\alpha}$ times the display brightness in the relative brightness mode. As $\alpha$, any of a positive value (an integer or a real number), a negative value (an integer or a real number), and 0 is used.

In the absolute brightness mode, display brightness can be maintained at desired brightness by the process described above. As a result, the user can readily adjust the respective photographing parameters and the like and convenience of the user improves. For example, in a case where an aperture value is manually adjusted in order to realize a desired depth of field, since the display brightness is maintained at desired brightness even when the aperture value changes, the user can readily adjust the aperture value, confirm the depth of field, and the like.

In addition, in a case of increasing an aperture of a diaphragm in order to realize a desired depth of field results in increasing blown-out highlights, the blown-out highlights can be resolved by manually adjusting photographing parameters other than the aperture value so that the exposure value increases (the amount of received light decreases). For example, at the exposure value of 10 shown in FIGS. 5B and 5C, display brightness saturates in a case where object brightness is equal to or higher than 200. Therefore, blown-out highlights occur in an image region where the object brightness is equal to or higher than 200. In a case where the exposure value is 11, display brightness does not saturate if object brightness is equal to or lower than 400. Therefore, blown-out highlights do not occur in an image region where the object brightness is equal to or lower than 400. Accordingly, by increasing the exposure value from 10 to 11, blown-out highlights can be resolved or blown-out highlights (a size of an image region where blown-out highlights occur) can be reduced. Even in such cases, since the display brightness is maintained at desired brightness, the user can readily adjust photographing parameters, confirm display, and the like.

In a similar manner, the user can confirm a change in a smoothness of movement in a case of changing a shutter speed value, a change in an amount of noise in a case of changing an ISO sensitivity value, and the like while maintaining display brightness at desired brightness.

In a case where photographing parameters are manually adjusted so that bright photographed image data (high key) or dark photographed image data (low key) is intentionally obtained, the user can readily adjust the photographing parameters. Specifically, the user can obtain high key or low key photographed image data by simply manually adjusting the exposure value so that desired display brightness (high key or low key brightness) is obtained in the relative brightness mode. In addition, by switching the display mode to the absolute brightness mode, the high key or low key display brightness can be maintained even when the photographing parameters are changed. Therefore, the user can readily adjust each photographing parameter so that desired characteristics are obtained as other characteristics (characteristics other than brightness) of photographed image data.

Furthermore, in the present embodiment, process information is recorded in association with photographed image data. Accordingly, in a case of editing photographed image data, display brightness confirmed at the time of photography can be reproduced and efficiency of editing can be improved. For example, although brightness of photographed image data decreases in a case where the exposure value increases, using process information enables brightness of the photographed image data to be increased so as to reproduce the display brightness confirmed at the time of photography. In addition, although brightness of photographed image data increases in a case where the exposure value decreases, using process information enables brightness of the photographed image data to be reduced so as to reproduce the display brightness confirmed at the time of photography.

As described above, according to the present embodiment, desired brightness can be readily achieved as display brightness in manual exposure in which an exposure value is set manually and, consequently, convenience of the user can be improved. Specifically, in the absolute brightness mode, a change in display brightness due to a change in the exposure value can be suppressed and the display brightness can be maintained at desired brightness. As a result, characteristics other than brightness can be visually confirmed more readily. In addition, in a case of manually adjusting a certain photographing parameter, other photographing parameters need not be manually adjusted in order to maintain display brightness. Therefore, the user is spared from unwanted hassle (load) and unintended changes to characteristics are avoided. As a result, the user can readily adjust each photographing parameter. Furthermore, by simply adjusting an exposure value (a photographing parameter) in the relative brightness mode, the user can readily adjust brightness to desired brightness.

Moreover, methods of generating corresponding image data are not particularly limited. For example, as a correction parameter, an offset value to be added to a gradation value may be used instead of a gain value (a display brightness gain value) by which the gradation value is multiplied. Corresponding image data may be generated by the display brightness converting unit 25 in consideration of gradation characteristics and display characteristics. In this case, the EOTF converting unit 22 and the OETF converting unit 26 are omitted. In addition, gradation characteristics of corresponding image data may be nonlinear characteristics.

Moreover, display brightness realized in the absolute brightness mode need not match display brightness corresponding to an exposure value at a timing of switching from the relative brightness mode to the absolute brightness mode. Specifically, an inclination of a linear characteristic portion (a range in which display brightness increases linearly with respect to an increase in object brightness) need not match an inclination corresponding to an exposure value at the timing described above. The realized display brightness need only approach the display brightness corresponding to the exposure value at the timing described above. Specifically, an inclination of the linear characteristic portion need only approach the inclination corresponding to the exposure value at the timing described above.

In addition, other display brightness may be determined based on the display brightness corresponding to the exposure value at the timing described above. Furthermore, the display brightness realized in the absolute brightness mode may be brought close to the other display brightness. Specifically, an inclination of the linear characteristic portion may be brought close to another inclination based on the inclination corresponding to the exposure value at the timing described above.

Furthermore, characteristics other than those of the linear characteristic portion may be further changed. A correspondence relationship between object brightness and display brightness need only be brought close from a correspondence relationship between the object brightness and display brightness corresponding to a present exposure value to a correspondence relationship between the object brightness and the display brightness corresponding to the exposure value at the timing described above. The correspondence relationship between the object brightness and the display brightness need not include a linear characteristic portion.

The display brightness realized in the absolute brightness mode may differ from the display brightness corresponding to the exposure value at the timing described above and other display brightness based on the display brightness corresponding to the exposure value at the timing described above. The realized display brightness need only be display brightness corresponding to an exposure value in a case where the relative brightness mode had been set or another display brightness based on the display brightness corresponding to an exposure value in a case where the relative brightness mode had been set. In other words, "an exposure value in a case where the relative brightness mode had been set" need not be "the exposure value at the timing of switching from the relative brightness mode to the absolute brightness mode". For example, "an exposure value in a case where the relative brightness mode had been set" may be "an exposure value at a timing which precedes, by a prescribed amount of time, the timing of switching from the relative brightness mode to the absolute brightness mode". In addition, a change in an exposure value to be taken into consideration is not limited to a change in the exposure value from the timing of switching from the relative brightness mode to the absolute brightness mode up to the present. For example, a start point of a period during which a change in the exposure value is to be taken into consideration may be a timing which precedes or follows, by a prescribed amount of time, the timing of switching from the relative brightness mode to the absolute brightness mode. An end point of the period during which a change in the exposure value is to be taken into consideration may be a timing which precedes the present by a prescribed amount of time.

Moreover, one piece of image data corresponding to one type of gradation value may be used instead of a plurality of pieces of image data corresponding to a plurality of types of gradation value. For example, gray scale image data may be used. In addition, as various types of image data, image data to which brightness data related to brightness is added as metadata may be used, and display may be performed at same display brightness as brightness related to the brightness data. In this case, for example, corresponding image data is generated by correcting the brightness data. An example of image data to which brightness data is added as metadata is image data conforming to the SMPTE ST 2086 standard.

Furthermore, as various types of image data, a combination of base image data and difference data may be used, and display may be performed based on composite image data obtained by compositing the base image data and the difference data. In this case, for example, corresponding image data is generated by correcting the base image data, the difference data, or both the base image data and the difference data. Corresponding image data may be generated by correcting the composite image data. For example, base image data is image data with a data size that is smaller than HDR image data (image data with an extremely large number of bits) and difference data is data related to a difference between the base image data and the HDR image data. Specifically, the base image data is JPEG image data. The difference data is brightness difference data related to a difference in brightness, color difference data related to a difference in color, or the like. The HDR image data can be restored by compositing the base image data and the difference data. In a case where the base image data is JPEG image data, a standard of a combination of the base image data and the difference data is referred to as a "JPEG-HDR standard" or the like.

Second Embodiment

A second embodiment of the present invention will be described below. In the present embodiment, an example in which same corresponding image data as the first embodiment is obtained by a different method from the method according to the first embodiment will be described. Moreover, since a configuration according to the present embodiment is the same as that of the first embodiment (FIGS. 1A, 1B, and 2), a description of the configuration according to the present embodiment will be omitted. In addition, hereinafter, processes that differ from those of the first embodiment will be described in detail and a description of processes that are the same as those of the first embodiment will be omitted.

Figure 6:
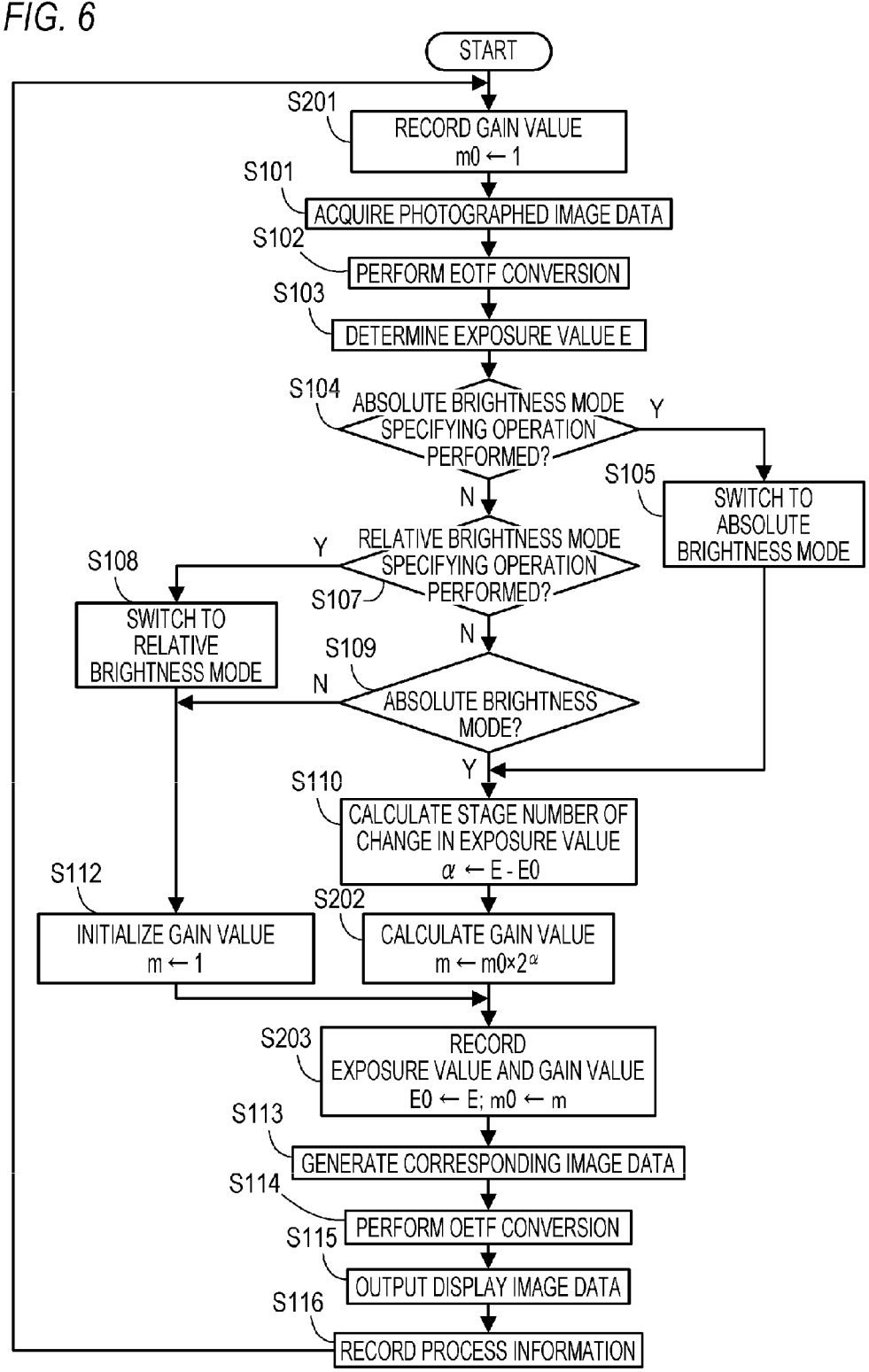
FIG. 6 shows an example of a processing flow of an image processing unit according to a second embodiment.

A process flow of the image processing unit 14 will be described with reference to the flow chart shown in FIG. 6. In the flow chart shown in FIG. 6, processes of S201 and S203 which were not performed in the flowchart shown in FIG. 4 (first embodiment) are performed. In the flow chart shown in FIG. 6, a process of S202 is performed in place of the process of S111 shown in FIG. 4. In addition, in the flow chart shown in FIG. 6, the process of S106 shown in FIG. 4 is not performed. Other processes shown in FIG. 6 are the same as the processes shown in FIG. 4. In FIG. 6, same processes as shown in FIG. 4 are being assigned same reference characters as in FIG. 4.

In the flowchart shown in FIG. 4, the exposure value E of a timing at which the set display mode is switched from the relative brightness mode to the absolute brightness mode is recorded as an exposure value EC) (S106). In addition, in the flow chart shown in FIG. 4, a difference between the exposure value E0 at the timing described above and a present exposure value E is calculated as a difference α (S110). On the other hand, in the flow chart shown in FIG. 6, an exposure value E is recorded as the exposure value E0 for each frame (S203). In addition, in the flow chart shown in FIG. 6, a difference between a present exposure value E and an immediately previous exposure value E0 (the exposure value E0 of a preceding frame) is calculated as the difference α (S110).

In addition, in S203, the display brightness converting unit 25 records the display brightness gain value m of the current frame in the internal memory as a display brightness gain value m0. Furthermore, the display brightness converting unit 25 refers to the display brightness gain value m0 in a process of S202 with respect to a next frame. Specifically, in S202, the display brightness converting unit 25 determines m0×2$^{\alpha}$ as the display brightness gain value m of the current frame.

In the absolute brightness period, the display brightness gain value m0 is changed in a case where the exposure value E changes from the preceding frame (difference $\alpha \neq 0$) but the display brightness gain value m0 is maintained in a case where the exposure value E does not change from the preceding frame (difference $\alpha = 0$) (S202 and S203). In addition, the display brightness gain value m0 is initialized to 1 upon start of the flow chart shown in FIG. 6 (S201). The display brightness gain value m0 is also initialized to 1 during the relative brightness period (S112 and S203).

As described above, in the present embodiment, in the absolute brightness period, a correction parameter to be used this time is determined based on a difference between a present exposure value and an immediately previous exposure value and on an immediately previously used correction parameter (the display brightness gain value m). In addition, photographed image data (linear RGB photographed image data) is corrected using the determined correction parameter. Moreover, in the first embodiment, in the absolute brightness period, photographed image data is corrected based on a difference between an exposure value of a timing at which the set display mode is switched from the relative brightness mode to the absolute brightness mode and a present exposure value.

Furthermore, with both the method according to the first embodiment and the method according to the second embodiment, same image data based on a change in an exposure value from the timing described above up to the present is obtained as RGB corresponding image data. Specifically, in both the flow chart shown in FIG. 4 and the flow chart shown in FIG. 6, a same value based on a change in the exposure value from the timing described above up to the present is obtained as the display brightness gain value m. As a result, the same RGB corresponding image data is obtained by both the flow chart shown in FIG. 4 and the flow chart shown in FIG. 6.

As described above, according to the present embodiment, the same corresponding image data as the first embodiment can be obtained by a different method from the method according to the first embodiment and similar effects to the first embodiment can be obtained.

Third Embodiment

A third embodiment of the present invention will be described below. In the present embodiment, an example in which a user operation (a brightness change operation) for changing display brightness in the absolute brightness mode is performed will be described. For example, a brightness change operation is performed in order to restore display brightness to desired display brightness in a case where, after an exposure value is adjusted during the relative brightness period so as to realize the desired display brightness, object brightness changes during the absolute brightness period and the display brightness changes from the desired display brightness. Moreover, hereinafter, points (configurations and processes) that differ from those of the first and second embodiments will be described in detail and descriptions of processes that are the same as those of the first and second embodiments will be omitted. In addition, while an example in which characteristics of the present embodiment are combined with the second embodiment will be described below, characteristics of the present embodiment may also be combined with the first embodiment.

Figure 7:
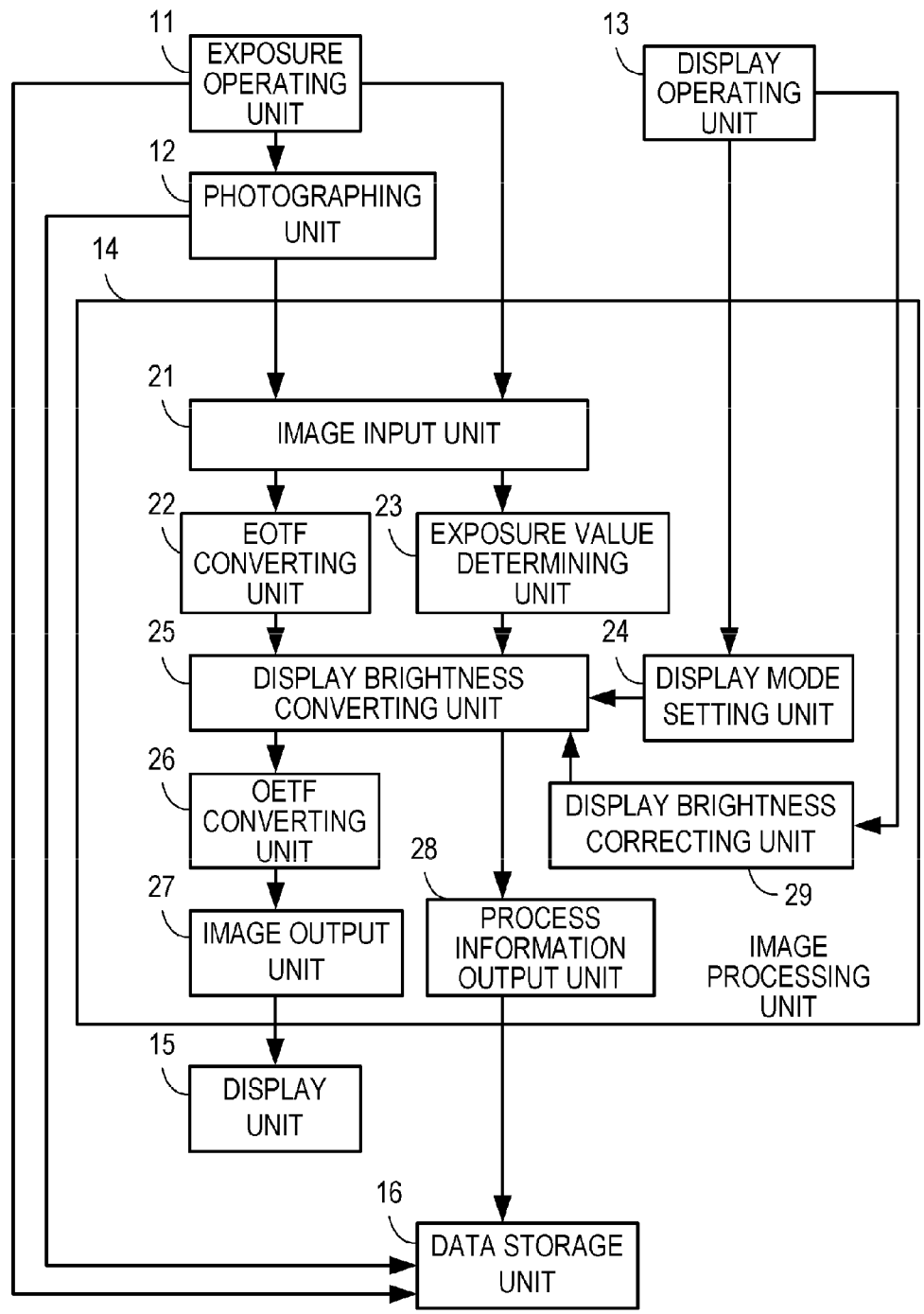
FIG. 7 shows a configuration example of an image processing unit according to a third embodiment.

FIG. 7 is a block diagram showing a configuration example of the image processing unit 14 according to the present embodiment. In FIG. 7, same functional units as shown in FIG. 2 are being assigned same reference characters as in FIG. 2. In the present embodiment, the display operating unit 13 further accepts a brightness change operation. For example, the display operating unit 13 includes an operating unit for specifying a change in display brightness. As the operating unit for specifying a change in display brightness, two operation buttons (a brightness increase button and a brightness reduction button), one rotating dial, or the like is used. The brightness increase button is a button for increasing display brightness and the brightness reduction button is a button for reducing display brightness. The rotating dial is rotated in one of a left direction and a right direction (a positive direction) in a case of increasing display brightness and rotated in an opposite direction (a negative direction) in a case of reducing display brightness.

The image processing unit 14 according to the present embodiment further includes a display brightness correcting unit 29. The display brightness correcting unit 29 performs a process of changing display brightness in a case where a brightness change operation is performed during the absolute brightness period. Moreover, a method of changing display brightness is not particularly limited as long as photographed image data is corrected based on a change in an exposure value from a timing of switching to the absolute brightness mode up to the present and on a brightness change operation. In addition, display brightness after change may be any display brightness as long as the display brightness is based on display brightness corresponding to the exposure value at the timing described above and on a brightness change operation. In a case where a brightness change operation is performed during the absolute brightness period, display brightness to be realized need only approach display brightness obtained by changing display brightness corresponding to the exposure value at the timing described above in accordance with the brightness change operation from display brightness corresponding to a present exposure value.

Figure 8:
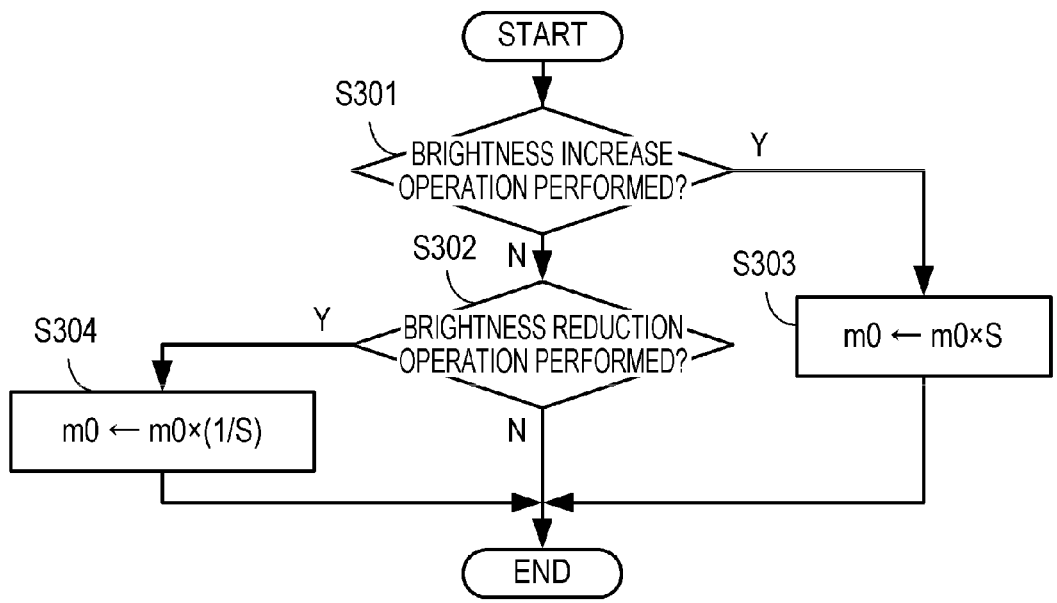
FIG. 8 shows an example of a processing flow of a display brightness correcting unit according to the third embodiment.

A process flow of the display brightness correcting unit 29 will be described with reference to the flow chart shown in FIG. 8. For example, the flow chart shown in FIG. 8 is performed between processes of S204 and S205 in the flow chart shown in FIG. 6 (second embodiment).

First, in S301, the display brightness correcting unit 29 determines whether or not a brightness increase operation (a brightness change operation for specifying an increase in display brightness) has been performed. In a case where the display operating unit 13 includes a brightness increase button and a brightness reduction button, the brightness increase operation is a user operation involving pressing down on the brightness increase button. In a case where the display operating unit 13 includes a rotating dial, the brightness increase operation is a user operation involving rotating the rotating dial in the positive direction by a prescribed angle or more. In a case where a brightness increase operation has not been performed, the process advances to S302. In a case where a brightness increase operation has been performed, the process advances to S303.

In S302, the display brightness correcting unit determines whether or not a brightness reduction operation (a brightness change operation for specifying a reduction in display brightness) has been performed. In a case where the display operating unit 13 includes a brightness increase button and a brightness reduction button, the brightness reduction operation is a user operation involving pressing down on the brightness reduction button. In a case where the display operating unit 13 includes a rotating dial, the brightness reduction operation is a user operation involving rotating the rotating dial in the negative direction by a prescribed angle or more. In a case where a brightness reduction operation has not been performed, the present flow chart is ended. In a case where a brightness reduction operation has been performed, the process advances to S304. Alternatively, the process of S302 may be performed before S301. In this case, the process is advanced to S301 from S302 in a case where a brightness reduction operation has not been performed.

In S303, the display brightness correcting unit 29 increases a display brightness gain value m0 by a factor of S times. As a result, display brightness is increased by a factor of S times. In S304, the display brightness correcting unit 29 reduces the display brightness gain value m0 by a factor of 1/S times. As a result, display brightness is reduced by a factor of 1/S times. S denotes a prescribed value. For example, in a case of S=2, the display brightness is increased by a factor of 2 times every time a brightness increase operation is performed and the display brightness is reduced by a factor of 1/2 times every time a brightness reduction operation is performed.

Moreover, the value of S is not particularly limited. The value of S may be a value that can be changed by the user. Specifically, the value of S may be set or changed in accordance with a user operation (for example, a user operation for specifying the value of S). A plurality of brightness increase buttons respectively corresponding to different values of S and a plurality of brightness reduction buttons respectively corresponding to different values of S may be used. In this case, the display brightness gain value m0 is changed using the value of S corresponding to a pressed button (a brightness increase button or a brightness reduction button). The values of S corresponding to the buttons (brightness increase buttons and brightness reduction buttons) may be changeable. A value which increases as a pressing time of a brightness increase button or a brightness reduction button increases may be used as the value of S. A value which increases as an amount of rotation of the rotating dial increases may be used as the value of S.

As described above, in the present third embodiment, display brightness is changed in accordance with a brightness change operation during the absolute brightness period. Accordingly, in the absolute brightness period, desired display brightness can be realized even when object brightness changes and the convenience of the user can be further improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-103316, filed on May 24, 2016, which is hereby incorporated by reference herein in its entirety.

What is claimed is:

1. An image processing apparatus, comprising at least one processor that operates as:
   a first acquiring unit configured to acquire first image data obtained by imaging of an object;
   a second acquiring unit configured to acquire information related to a first exposure value used for imaging;
   a setting unit configured to set any of a plurality of display modes including a first display mode and a second display mode; and
   a generating unit configured to generate, from the first image data, second image data corresponding to a display mode set by the setting unit, wherein
   in a case where the first display mode has been set by the setting unit, the generating unit generates second image data having brightness corresponding to the first exposure value, so that a correspondence relationship which corresponds to the first exposure value is obtained as a correspondence relationship between brightness of the object and display brightness,
   in a case where the second display mode has been set by the setting unit, the generating unit generates second image data having brightness corresponding to a second exposure value which differs from the first exposure value, so that a correspondence relationship which corresponds to the second exposure value is obtained as the correspondence relationship between brightness of the object and display brightness, and
   the second exposure value used in the second display mode is changeable in accordance with a user instruction.

2. The image processing apparatus according to claim 1, wherein
   in the case where the second display mode has been set by the setting unit, the generating unit generates the second image data by correcting the first image data in accordance with a difference between the first exposure value and the second exposure value.

3. The image processing apparatus according to claim 1, wherein
in a case where the second display mode has been set by the setting unit and the first exposure value is smaller than the second exposure value, the generating unit generates the second image data by performing a correction involving reducing brightness of the first image data.

4. The image processing apparatus according to claim 1, wherein
in a case where the second display mode has been set by the setting unit and the first exposure value is larger than the second exposure value, the generating unit generates the second image data by performing a correction involving increasing brightness of the first image data.

5. The image processing apparatus according to claim 1, wherein
in a case where the set display mode is switched from the first display mode to the second display mode, the generating unit repetitively generates the second image data so that brightness of the second image data gradually changes from brightness corresponding to the first exposure value to brightness corresponding to the second exposure value.

6. The image processing apparatus according to claim 1, wherein
the correspondence relationship between brightness of the object and display brightness includes a linear characteristic portion in which display brightness changes linearly with respect to a change in the brightness of the object,
in the case where the first display mode has been set by the setting unit, the generating unit generates the second image data so that an inclination corresponding to the first exposure value is obtained as an inclination of the linear characteristic portion, and
in the case where the second display mode has been set by the setting unit, the generating unit generates the second image data so that an inclination corresponding to the second exposure value is obtained as an inclination of the linear characteristic portion.

7. The image processing apparatus according to claim 1, wherein
the first image data has gradation characteristics in which a gradation value changes non-linearly with respect to a change in an amount of received light in the imaging, and
the generating unit includes:
a characteristic converting unit configured to convert the first image data into linear image data having gradation characteristics in which a gradation value changes linearly with respect to a change in the amount of received light; and
a brightness converting unit configured to generate the second image data from the linear image data.

8. The image processing apparatus according to claim 7, wherein
in the case where the first display mode has been set by the setting unit, the brightness converting unit determines the linear image data as the second image data, and
in the case where the second display mode has been set by the setting unit, the brightness converting unit generates the second image data by multiplying each gradation value of the linear image data by a gain value.

9. The image processing apparatus according to claim 1, wherein
the first acquiring unit acquires a plurality of pieces of first image data respectively corresponding to a plurality of types of gradation values, and
the generating unit generates a plurality of pieces of second image data respectively corresponding to the plurality of pieces of first image data.

10. The image processing apparatus according to claim 1, wherein
in the case where the second display mode has been set by the setting unit, the generating unit determines parameters to be used at a current time, based on a difference between the first exposure value and an immediately previous exposure value and on immediately previously used parameters for generating the second image data.

11. The image processing apparatus according to claim 1, wherein
in the case where the second display mode has been set by the setting unit, the generating unit, in accordance with the user instruction for changing the second exposure value, generates second image data having brightness corresponding to a second exposure value after a change in accordance with the user instruction.

12. The image processing apparatus according to claim 1, wherein
the at least one processor further operates as a recording unit configured to record in a storage unit information used to generate the second image data in association with the first image data.

13. The image processing apparatus according to claim 1, wherein
the first exposure value depends on each of a plurality of photographing parameters, and
the information related to the first exposure value indicates each of the plurality of photographing parameters.

14. An image processing method, comprising:
acquiring first image data obtained by imaging of an object;
acquiring information related to a first exposure value used for imaging;
setting any of a plurality of display modes including a first display mode and a second display mode; and
generating, from the first image data, second image data corresponding to a set display mode, wherein
in a case where the first display mode has been set, second image data having brightness corresponding to the first exposure value is generated so that a correspondence relationship which corresponds to the first exposure value is obtained as a correspondence relationship between brightness of the object and display brightness,
in a case where the second display mode has been set, second image data having brightness corresponding to a second exposure value which differs from the first exposure value is generated so that a correspondence relationship which corresponds to the second exposure value is obtained as the correspondence relationship between brightness of the object and display brightness, and
the second exposure value used in the second display mode is changeable in accordance with a user instruction.

15. A non-transitory computer readable medium that stores a program, wherein
the program causes a computer to execute:

acquiring first image data obtained by imaging of an object;

acquiring information related to a first exposure value used for imaging;

setting any of a plurality of display modes including a first display mode and a second display mode; and generating, from the first image data, second image data corresponding to a set display mode, in a case where the first display mode has been set, second image data having brightness corresponding to the first exposure value is generated so that a correspondence relationship which corresponds to the first exposure value is obtained as a correspondence relationship between brightness of the object and display brightness, in a case where the second display mode has been set, second image data having brightness corresponding to a second exposure value which differs from the first exposure value is generated so that a correspondence relationship which corresponds to the second exposure value is obtained as the correspondence relationship between brightness of the object and display brightness, and the second exposure value used in the second display mode is changeable in accordance with a user instruction.

* * * * *